April 19, 1938.   G. SLAYTER   2,114,545
SINTERING GLASS BATCH
Filed Aug. 17, 1935
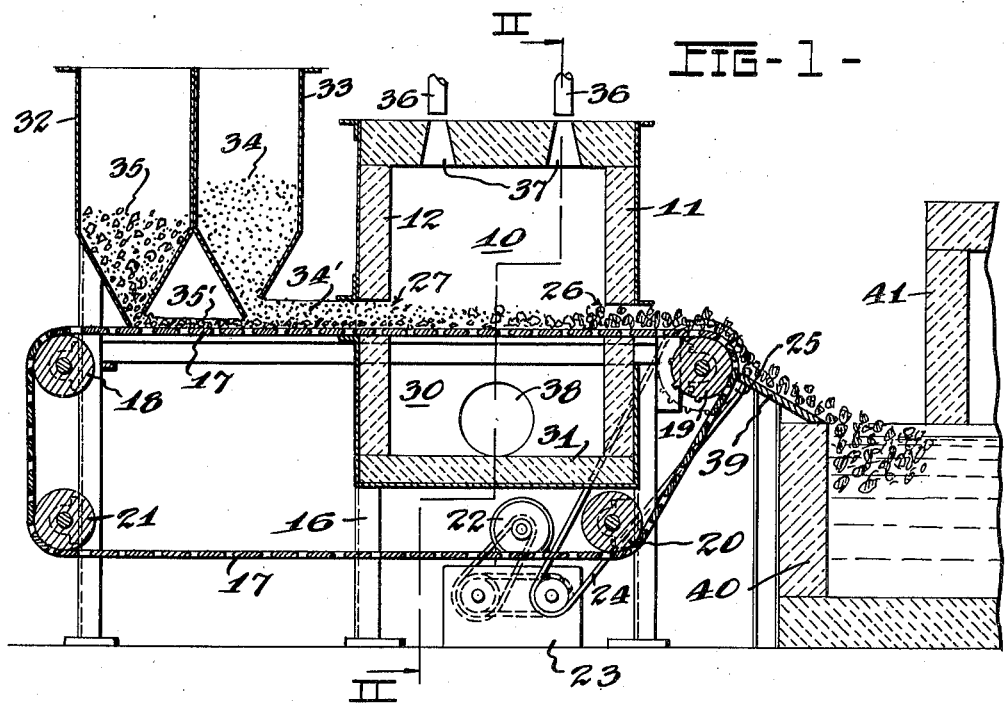
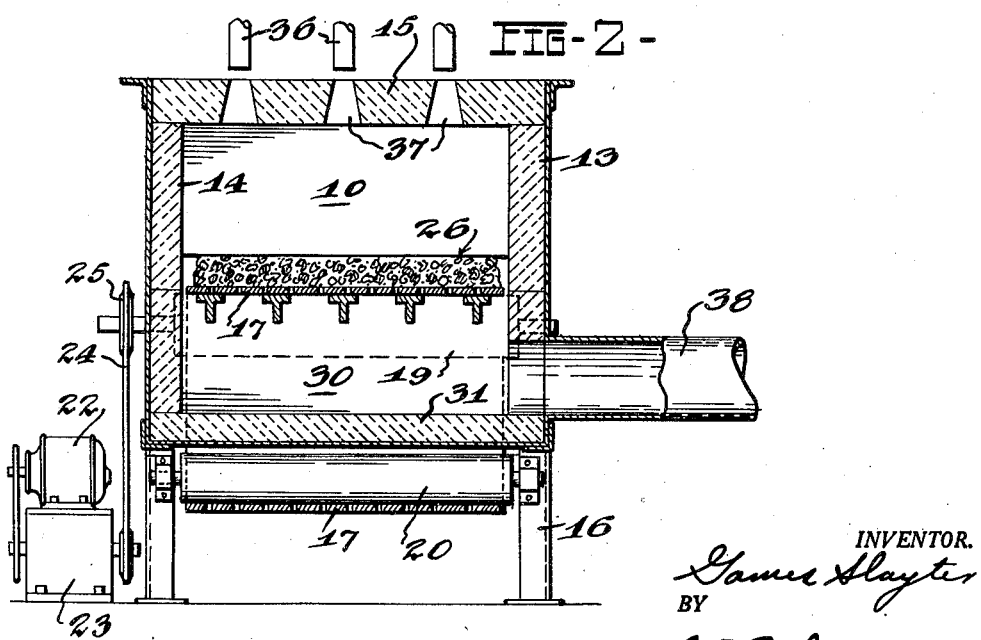
INVENTOR.
James Slayter
BY
J. F. Rule ATTORNEY Patented Apr. 19, 1938

2,114,545

UNITED STATES PATENT OFFICE 2,114,545

SINTERING GLASS BATCH

Games Slayter, Newark, Ohio, assignor to Owens-Illinois Glass Company, a corporation of Ohio Application August 17, 1935, Serial No. 36,712

3 Claims. (Cl. 49—77)

My invention relates to a method and apparatus for sintering glass batch and the like as a preliminary step in the operation of melting and refining glass batch, which may comprise raw materials and cullet, for use in manufacturing glassware.

A large proportion of the glassware produced at the present time is made from glass which is melted in tank furnaces of the continuous type. The glass batch is ordinarily introduced into the furnace through a dog house at one end thereof and then melted by heat applied to the surface of the melting batch, gas burners usually being employed. This method is very inefficient in the use of fuel, a large percentage of the heat being wasted. This is due in part to the fact that the heat from the burning fuel is applied only to the surface of the melting glass and does not penetrate to any great extent downward into the mass which is ordinarily several feet in depth. The large mass of glass within the tank, usually many tons, must be maintained for a long period at a high temperature, resulting in much loss of heat.

Such method of melting the batch results in a large volume of gas in the form of seeds or bubbles, being incorporated in the mass of melting material. Owing to the minuteness of these seeds, the great depth of glass in the tank and the comparatively cold and viscous condition of the glass at a distance beneath the surface, these seeds or bubbles rise very slowly, so that a long time is required for them to reach the surface and disappear. The process of fining the glass thus requires much time.

An object of my invention is to provide an improved method and apparatus by which the length of time required to melt and refine the glass and the amount of fuel required, are greatly reduced.

A further object of the invention is to provide means by which the size of the melting and refining tank may be greatly reduced as compared with conventional tanks in which the entire melting and refining process is carried out.

Other objects of the invention will appear hereinafter.

Referring to the accompanying drawing, which illustrates an apparatus adapted for use in practicing my invention:

Fig. 1 is a sectional side elevation of the apparatus.

Fig. 2 is a cross-section at the line II—II on Fig. 1.

As shown in the drawing, the apparatus comprises a sintering chamber 10 having front and rear walls 11 and 12 respectively, side walls 13 and 14, and a top or cover 15, all made of refractory material. This chamber is supported on a framework 16. An endless conveyor 17 runs on rolls 18, 19, 20 and 21 journaled on the framework 16.

The conveyor is driven by means of an electric motor 22 having a driving connection with the roll 19 through speed reduction gearing within a gear box 23, a drive chain 24 and a sprocket wheel 25 on the shaft of the roll 19. The upper horizontal lead of the chain conveyor 17 extends through openings 26 and 27 at the lower ends of the walls 11, 12. The conveyor, as shown, forms the floor of the chamber 10. Beneath the sintering chamber 10 is a suction chamber 30 having a floor 31, the vertical walls of the suction chamber being a downward continuation of the vertical walls of the chamber 10.

Hoppers 32 and 33 are positioned at the rear of the sintering chamber 10 and above the conveyor 17. The forward hopper 33 is adapted to contain raw batch 34 of any approved formula, depending upon the kind of glass which is being melted. The rear hopper 32 is adapted to contain cullet 35.

The conveyor 17, which is preferably an openwork or chain conveyor, is driven continuously by the motor 22. Cullet 35 is continuously discharged from the hopper 32 onto the traveling conveyor in a thin layer 35' evenly spread across substantially the entire width of the conveyor. A layer 34' of the raw batch is in like manner discharged from the hopper 33 and overlies the layer of cullet. These superposed layers of raw batch and cullet are carried through the sintering oven 10.

Fuel burners 36 positioned over and in register with openings 37 in the roof 15, direct the melting flames downward onto the batch as the latter advances through said chamber. The intense heat quickly sinters the batch. A partial vacuum is maintained within the chamber 30 from which the air and hot gases of combustion are withdrawn through a duct 38 leading to a suction fan (not shown).

The flames or hot gases of combustion are applied directly to the raw batch so that the latter is quickly raised to a fusing or melting temperature. The cullet therebeneath is also raised to a high temperature. As a result, the materials are sintered or fused together into comparatively large masses, combining the cullet 35 and batch 34. The gases or seeds formed during this sintering operation readily escape, as they are not confined or retarded by an overlying head of glass.

This sintered material as it passes beyond the chamber 10 is discharged from the conveyor 17 onto an inclined platform or chute 39, down which it is carried by gravity into the receiving end or dog house 40 of the tank furnace 41. The latter may be of conventional construction. However, a comparatively small amount of heat is required to complete the melting and refining of the sintered batch. Also, the time required to complete the melting and refining operation is comparatively short, so that the furnace 41 may be much smaller than would be necessary for melting and fining an equal quantity of raw batch.

Modifications may be resorted to within the spirit and scope of my invention.

I claim:

1. The method of producing refined, molten, siliceous material which comprises superposing a layer of raw batch over a layer of cullet, passing hot gases through said superposed layers and thereby sintering the material, forming individual partially fused lumps of said sintered material, and completely melting and refining said material in an individual high temperature furnace.

2. The method of producing refined molten glass, which comprises superposing a layer of raw batch in comminuted form over a layer of cullet, passing heated gases through the superposed layers and thereby sintering the material, forming individual partially fused lumps of said sintered material, and completely melting and refining said material in an individual high temperature furnace.

3. The method of producing refined molten glass which comprises advancing a layer of raw batch materials, directing against and passing hot gases from products of combustion through said layer to cause a preheating thereof and a sintering of said materials into partially fused lumps, said preheating being insufficient to cause a complete melting of said materials, and then completely melting and fining said sintered batch materials in an individual high temperature glass furnace.

GAMES SLAYTER.